United States Patent
Dusserre-Telmon et al.

(10) Patent No.: US 6,261,003 B1
(45) Date of Patent: Jul. 17, 2001

(54) APPARATUS FOR CONTROLLING THE RADIAL PLAY OF A ROLLER BEARING

(75) Inventors: Guy Dusserre-Telmon, Sivry-Courtry; Daniel Georges Plona, Vulaines sur Seine, both of (FR)

(73) Assignee: Societe Nationale d'Etude et de Construction de Moteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/244,639

(22) Filed: Feb. 4, 1999

(30) Foreign Application Priority Data

Feb. 18, 1998 (FR) .................................................. 98 01940

(51) Int. Cl.[7] .................................................. F16C 33/58
(52) U.S. Cl. ............................................................ 384/475
(58) Field of Search .................................... 184/6.4, 6.14, 184/6.12, 7.4; 384/474, 475, 473, 466, 465, 462; 251/11

(56) References Cited

U.S. PATENT DOCUMENTS

| 3,722,967 | 3/1973 | Lewis . | |
|---|---|---|---|
| 3,895,689 | * 7/1975 | Swearingen | 184/6.4 |
| 4,569,196 | * 2/1986 | Waddington | 184/6.11 X |
| 4,738,336 | 4/1988 | Smith et al. . | |
| 4,883,082 | * 11/1989 | Pirkle | 251/11 X |
| 5,253,985 | * 10/1993 | Ruetz | 384/473 X |
| 5,618,409 | 4/1997 | Kreill . | |
| 5,711,615 | * 1/1998 | Stitz et al. | 384/473 |
| 5,749,660 | 5/1998 | Dusserre-Telmon et al. . | |
| 5,971,107 | * 10/1999 | Stitz et al. | 184/7.4 |
| 5,984,257 | * 11/1999 | Baek et al. | 251/11 |

FOREIGN PATENT DOCUMENTS

| 0 283 080 | 9/1988 | (EP) . |
| 0 664 424 | 7/1995 | (EP) . |
| 2 740 187 | 4/1997 | (FR) . |

* cited by examiner

Primary Examiner—David A. Bucci
Assistant Examiner—Colby Hansen
(74) Attorney, Agent, or Firm—Oblon, Spivak, McClelland, Maier & Neustadt, P.C.

(57) ABSTRACT

A lubricant drainage circuit outside a roller bearing is fitted such that an output draining through a drained ring is controlled by providing drainage channels crossing the ring and having different inclinations in a circumferential direction of the drained ring.

5 Claims, 2 Drawing Sheets

APPARATUS FOR CONTROLLING THE RADIAL PLAY OF A ROLLER BEARING

BACKGROUND OF THE INVENTION

1. Field of the Invention

The present invention relates to an apparatus for controlling the radial play of a roller bearing by adjusting the quantity of oil passing through its drained outer ring.

2. Description of the Background

Some roller bearings, particularly those rotating at very high speeds, are continually lubricated by a dedicated circuit. Under normal circumstances the oil drains away outside the roller bearing by being laterally expelled by the forces of inertia imparted to it by the rotating components. However, another design exists in which the oil leaves the roller bearing radially through channels that are pierced through one of the rings, usually the outer ring. This roller bearing (or this ring) is said to be drained. One of the aims of this design is to reduce or even eliminate oil being laterally propelled out of the roller bearing and thereby eliminating the need for lubricant recovery scoops provided near the roller bearing. Another even more important advantage is that the drained ring is cooled more effectively by the lubricant. The outer ring of a roller bearing usually tends to heat to a higher degree than the inner ring and the difference in temperature between the two rings can be several degrees when the roller bearing rotates at a steady speed. In a standard roller bearing where the outer ring is drained, the difference in temperature is reduced, therefore the play that the differential thermal expansion causes around the ball bearings or more generally around the roller bearing components is also reduced. It may be concluded that correct application of drainage enables the play around the roller bearing to be reduced and consequently improves the operation.

Some drainage circuit construction methods have been suggested by the present applicant in a previous French patent (2 740 187 A). In the present patent discussion centers around the means for adjusting the drained output in order to modify the operating conditions of the roller bearing and particularly the radial play.

SUMMARY OF THE INVENTION

The invention consists of equipping the drainage circuit with means for adjusting the output of drained lubricant particularly in order to control the cooling of the drained ring and the play of the roller bearing.

In its most standard form, the invention relates to a lubricant drainage circuit outside a roller bearing that comprises drainage channels through a roller bearing ring, characterized by the fact that the drainage channels are each inclined differently in a circumferential or axial direction to the ring such that the output of drained lubricant may be controlled.

BRIEF DESCRIPTION OF THE DRAWINGS

Several different applications of the invention have been projected, as may be seen from the descriptions of the following figures.

DETAILED DESCRIPTION ON THE INVENTION

Figure 1:
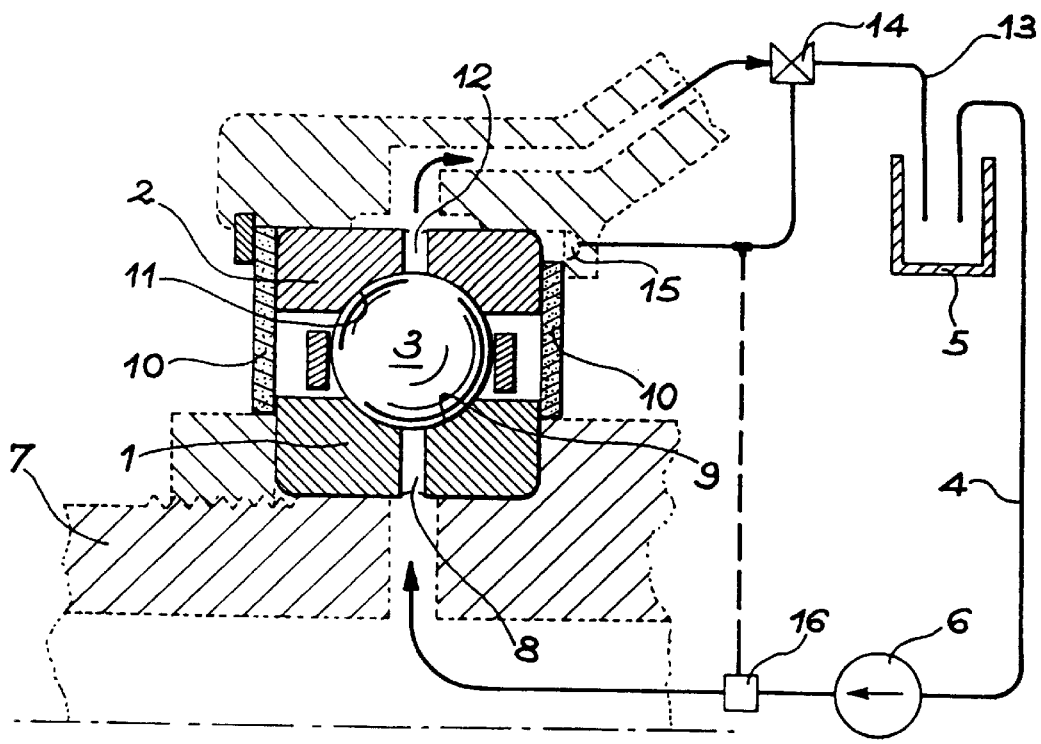
FIG. 1 is an overall view of a drained roller bearing.
Figure 2:
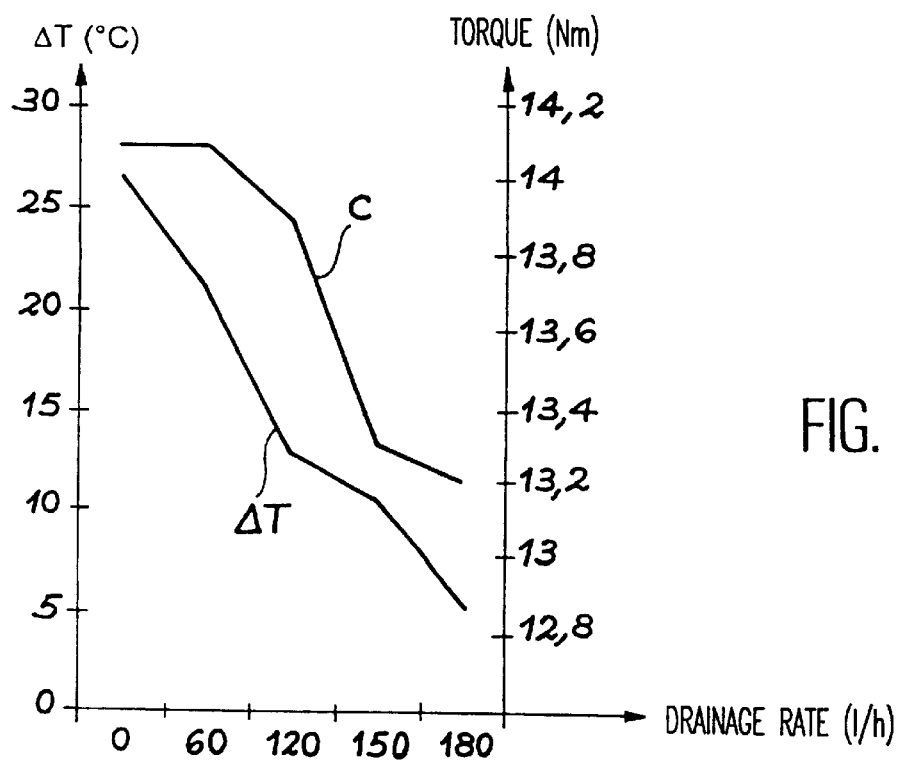
FIG. 2 is a diagram that shows the performance characteristics of the invention

The roller bearing in FIG. 1 comprises an inner ring 1, an outer ring 2 and bearing components such as balls 3 between the two rings. A lubrication circuit comprises a feed system 4 that originates in an oil tank 5, said feed system comprises a pump 6 and is extended, for example, in the axis of a shaft 7, around which inner ring 1 is fitted, and then continues in radially directed feed channels 8 that pass through inner ring 1 and eventually end opposite balls 3. The oil drains laterally between balls 3 and an internal roller bearing channel 9 and travels towards outer ring 2 still continuing to pass around balls 3. Advantageously, lateral end-shields 10 close the roller bearing and almost completely prevent oil leaks being propelled. The oil that is pushed outwards due to centrifugal force tends therefore to accumulate between the external roller bearing channel 11 and balls 3 but the drainage channels 12 that are provided through outer ring 2 enable the oil to drain away from the roller bearing. The drainage channels 12 constitute the first section of a drainage circuit 13 that ends in tank 5, into which the oil is drained before it re-enters the feed system, and comprises a shutoff valve 14 that can be opened or closed in varying degrees, thus enabling the output of oil that crosses through drainage circuit 13 to be controlled. FIG. 2 shows that the increase in drained output reduces the torque C on the roller bearing produced by the friction and that said increase also reduces the difference in temperature $\Delta T$ between rings 1 and 2, thereby reducing the play in the roller bearing. In order to control the play that is an important factor contributing to the dynamics of the shaft assembly as a whole, the drained output is controlled and varies depending on the conditions of operation.

This adjustment of the output may be made actively or passively according to the following propositions: An active adjustment comprises a valve that can, for example, be controlled by a temperature sensor 15 provided on the outer ring 2 or on the lubricant drainage circuit 13, said sensor 15 gradually opening the valve when a suitable temperature on the outer ring 2 is reached and enabling the valve 14 to gradually close when the temperature drops; alternatively, sensor 15 could also be replaced by a different sensor that is also located on said outer ring and that measures the vibrations to which outer ring 2 is subject. Valve 14 then opens if the vibrations reach a given threshold and closes when the vibrations decrease since a lack of drainage has been seen to produce thermal dilation to a greater degree in the outer ring 2 which leads to play in the roller bearing thus causing vibrations to occur; in yet another design, valve 14 could be controlled by a tachometer 16 that measures the rotation speed of shaft 7 in order to gradually reduce the drained output when the rotation speed increases.

Figure 3:
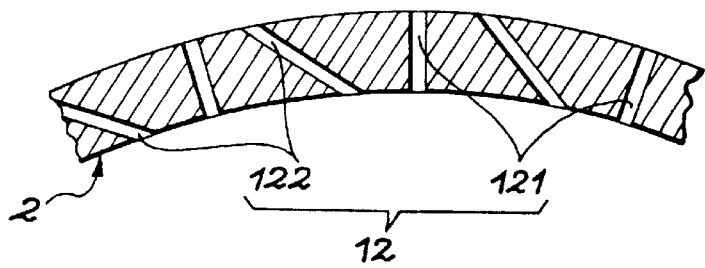
FIG. 3 shows a specific design of the drainage channels.

A feature of drainage is that the oil enters the drainage channels 12 more or less easily depending on the rotation speed. It is therefore possible to offer passively controlled drainage using a design such as that shown in FIG. 3 where drainage channels 12 comprise radial channels 121 at 0° inclination that alternate with inclined channels 122. The inclination of said inclined channels 122 can be at an angle of 80° to the radii of the roller bearing, in other words the inclined channels 122 are almost tangential to the outer ring 2.

Figure 4:
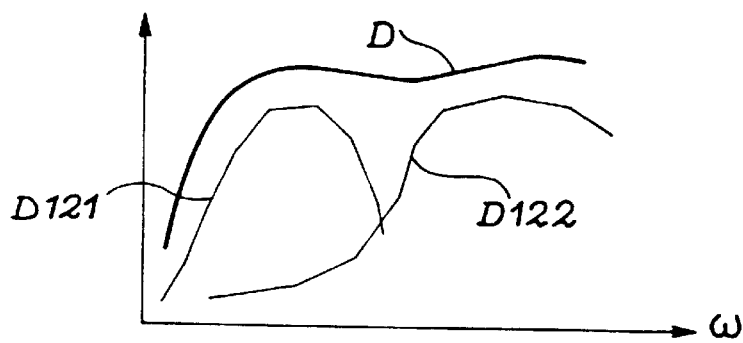
FIG. 4 is a diagram that shows the performance characteristics of the design in FIG. 3

FIG. 4 shows that the maximum drainage outputs provided by the sets of drainage channels are very variable depending on the rotation speed and only actually enable satisfactory drainage to occur within a relatively limited range of speeds. Curve D121 shows that radial drainage channels 121 (only slightly inclined) are suitable for low rotation speeds whereas curve D122 shows that drainage channels 122, that are very inclined, enable satisfactory drainage to occur at higher rotation speeds. However, total drained output curve D, obtained by superimposing both outputs, is more or less horizontal for most of the rotation speeds concerned. This curve D shows that constant drainage output can generally be obtained, as well as any other drainage output characteristics, depending on the speed that is chosen in order to achieve the highest performance level from the turbo machine. The idea of dividing drainage channels 12 into distinct sets according to their degree of inclination can clearly be extended to include other degrees of inclination and sets with different numbers of channels.

Figure 5:
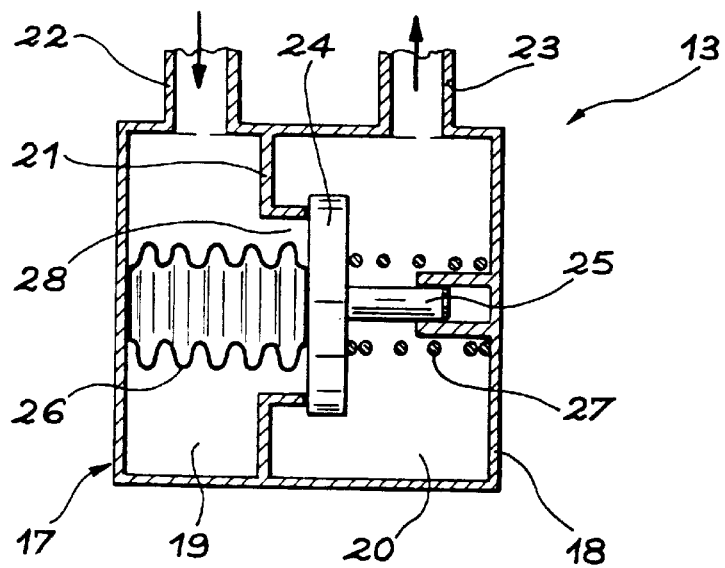
FIG. 5 shows a progressive shutoff valve.

The output adjusting valve may, however, not be controlled by a measuring system that includes a sensor. FIG. 5 shows an automatic valve 17 that is capable of replacing the shutoff valve 14. The automatic valve 17 consists of a housing 18 that is divided into an upstream chamber 19 and a downstream chamber 20 separated by a partition 21, and also consists of lubricant inlet and outlet channels 22 and 23 that constitute part of the drainage circuit 13, said inlet and outlet channels 22 and 23 being connected respectively to chambers 19 and 20.

A seal 24 is capable of moving in one of chambers 20 opposite an opening 28 in partition 21. The displacements of said seal 24 are controlled by a sliding rod 25 to which it is attached. A gas-filled bellows 26 separates said seal 24 from the housing 18 near upstream chamber 19 and a spring 27 forces said seal 24 against the bellows 26. The bellows 26 dilates when the temperature of the lubricant rises and forces the seal 24 off the partition 21 against the spring 27. When the temperature of the lubricant drops, the bellows 26 contracts and the seal 24 is forced back in the opposite direction towards partition 21 and gradually prevents the lubricant from passing through opening 28. The seal 24 is also capable of completely blocking the opening by coming into contact with partition 21; the automatic valve 17 is then closed. The closing and opening of the valve 17 depend on the temperature of the lubricant, as does the amount of drained output.

Finally, it should be pointed out that the lubricant that leaves outer ring 2, or more generally the drained ring, is under considerable pressure (usually several bar). The pressure may be used to operate a machine or device by connecting said machine or device to the drainage circuit 13. For example, a fluid bearing may be placed near the roller bearing as described in the previous patent mentioned above.

What is claimed is:

1. A lubricant drainage circuit outside a roller bearing, comprising:

at least one ring of the roller bearing;

said at least one ring having drainage channels radially crossing said at least one ring;

said drainage channels circumferentially and sequentially alternating between a first angle that is substantially radial to said at least one ring, and a second angle that is inclined with respect to said first angle; and said first and second angles being selected to obtain a variable drainage output at different rotational speeds of the roller bearing.

2. A lubricant drainage circuit according to claim 1, wherein the first angle is 0° from a radial direction and the second angle is 80° from the radial direction.

3. A lubricant drainage circuit according to claim 1, further comprising:

an automatic shutoff valve connected to the drainage channels.

4. A lubricant drainage circuit according to claim 3, wherein the automatic shutoff valve includes an actuating component that changes shape depending on temperature so as to open and close the valve.

5. A lubricant drainage circuit according to claim 4 wherein the actuating component includes a movable seal having a first side and a second side, a sliding rod attached to the first side of the seal, a gas-filled bellows attached to the second side of the seal, and a spring surrounding the sliding rod.

* * * * *